United States Patent [19]

Eccleston et al.

[11] Patent Number: 5,058,960
[45] Date of Patent: Oct. 22, 1991

[54] PENDULUM-TYPE ACCELLEROMETER FOR ELECTRICALLY-ACTUATED BRAKING SYSTEMS

[75] Inventors: Larry Eccleston; Barry G. Austin, both of Marshall, Mich.

[73] Assignee: Tekonsha Engineering Company, Tekonsha, Mich.

[21] Appl. No.: 390,280

[22] Filed: Aug. 7, 1989

[51] Int. Cl.⁵ .............................................. B60T 8/18
[52] U.S. Cl. ............................ 303/24.1; 73/517 R; 303/7; 188/112 R
[58] Field of Search ................ 73/517 B, 517 R, 514, 73/517 AV, 517 A; 303/24.1, 9.67, 9.68, 7; 307/309, 362; 188/112 A, 112 R, 3 R

[56] References Cited

U.S. PATENT DOCUMENTS

| | | |
|---|---|---|
| 3,738,710 | 6/1973 | Pokriachek et al. |
| 3,897,979 | 8/1975 | Vangalis et al. ................ 303/24.1 |
| 3,909,075 | 9/1975 | Pittet, Jr. et al. |
| 3,953,084 | 4/1976 | Pittet, Jr. et al. ................ 303/24.1 |
| 3,967,863 | 7/1976 | Tomecek et al. ................ 303/24.1 |
| 3,981,544 | 9/1976 | Tomecak et al. ................ 303/92 |
| 4,030,756 | 6/1977 | Eden . |
| 4,277,895 | 7/1981 | Wiklund ........................ 73/517 B X |
| 4,660,418 | 4/1987 | Greenwood et al. ............ 73/517 X |
| 4,726,627 | 2/1988 | Frait et al. ........................ 303/24.1 |
| 4,849,655 | 7/1989 | Bennett ........................ 303/24.1 X |

Primary Examiner—Douglas C. Butler

Attorney, Agent, or Firm—Price, Heneveld, Cooper, DeWitt & Litton

[57] ABSTRACT

A freely-flexing cantilever-type inertial sensor is suspended from one end so that its other end may move in response to inertial forces, for example, as a result of braking in a towing vehicle. The pendulum blade is secured to a rigid support structure in a manner whereby the opposite sides of the pendulum, which is preferably of multiple-layer construction and is elastically-deformable, may freely shift longitudinally with respect to one another upon lateral flexure of the pendulum in response to inertial forces. Preferably, this is accomplished by utilizing an adhesive connection directly between the rigid support and the adjacent side of the pendulum, whereby only that layer closest to the support is directly secured to it. The support for the pendulum preferably includes a self-hinge by which the position of the pendulum-supporting portion may be changed with respect to that of a base portion, in order to current for non-verticality in the actual operating environment. The base preferably provides integral mounts for optical components which monitor the inertially-induced pendulum flexure, and the optical axis is preferably coincident with the pivot axis of the self-hinge. The pendulum blade is preferably a short, generally rigid member which is sufficiently stiff to have deflection of less than about 0.050 inches when subjected to inertial focres of about 1 G.

33 Claims, 3 Drawing Sheets

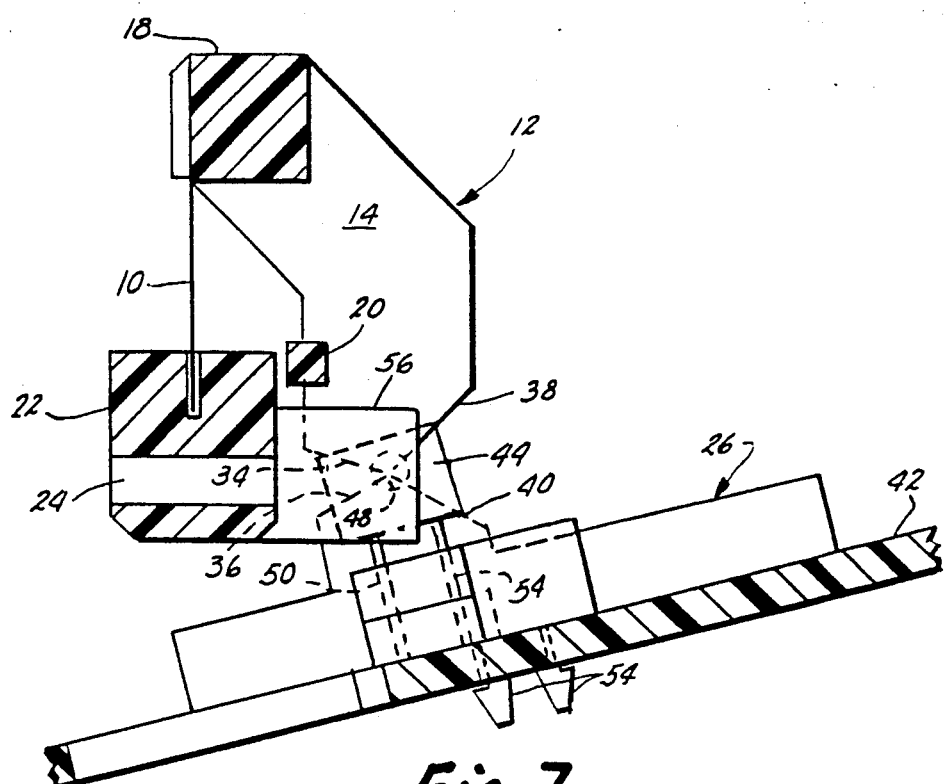
Fig. 7.
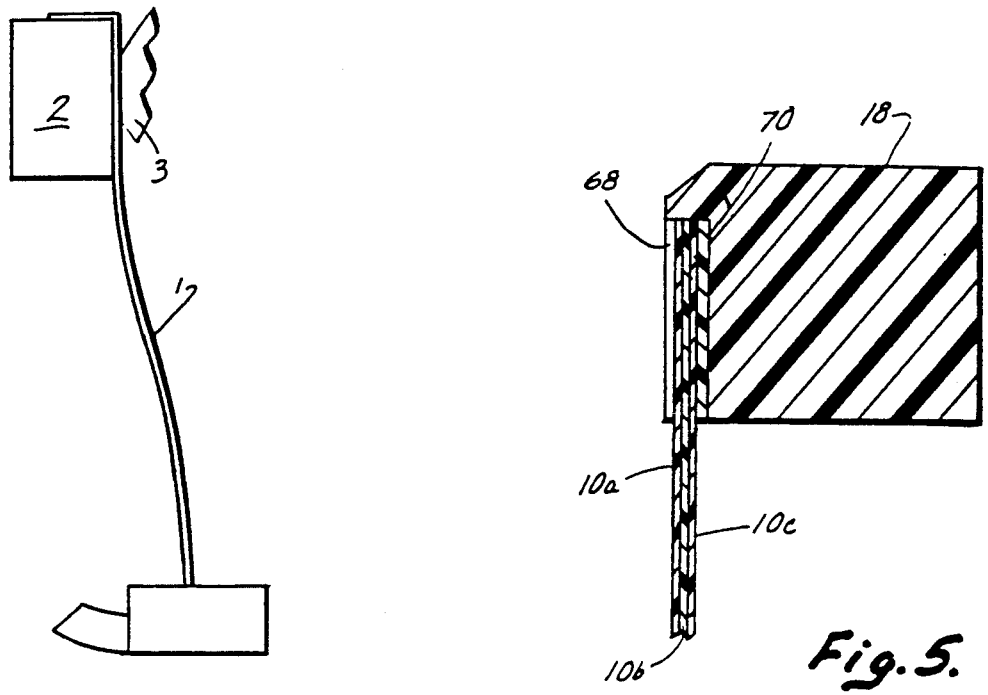
PRIOR ART
Fig. 6.
Fig. 5.

PENDULUM-TYPE ACCELLEROMETER FOR ELECTRICALLY-ACTUATED BRAKING SYSTEMS

BACKGROUND OF THE INVENTION

This invention relates generally to electrically-actuated braking systems for towed vehicles and the like, in particular the control means for such systems. More particularly still, the invention pertains to inertially-responsive control means for such braking systems, and in particular to inertial sensors, or accellerometers, for use therein.

Electrically-actuated braking systems for towed vehicles have, of course, been known and used for some time, as shown for example by earlier U.S. Pat. Nos. 3,738,710, 3,953,084, 3,967,863, 3,981,544, 3,909,075, and 4,030,756 (certain of which are related to one another) which show various attributes of such systems and additionally discuss the background and historical developments in this field. While early such systems were manually-controlled, subsequent developments utilized various means for achieving automatic actuation, and such automatic systems have come to rely upon inertial sensors as the most predominant such control means since they enable the towed vehicle ("trailer") brakes to be applied automatically as and when braking is desired. Of course, many particular developments have occurred over the years for enhancing and improving such inertial systems, as shown by the earlier patents noted above, together with those cited therein, etc.

What is believed to be the most successful and most frequently-utilized state of the art inertial sensing system is one analogous to that shown in the aforementioned U.S. Pat. Nos. 3,967,863 and 3,981,544, which are assigned to the assignee of the present invention. This system uses a pendulum-type inertial sensor, or accellerometer, which responds to braking of the tow vehicle by immediately causing a controlled application of the brakes on the towed vehicle. As disclosed in these patents, the pendulum utilized in this system comprises a "sandwich" of laminated members, e.g., a pair of outer layers of thin sheet metal, in particular beryllium copper, and a center layer of yieldable, elastomeric material, to which the outer metal layers are adhered. This construction is utilized to provide self-damping pendulum deflection, since the pendulum is mounted from its top and flexes laterally from the bottom when subjected to orthogonally-oriented acceleration forces, the pendulum being weighted at the bottom to augment such flexure.

This lateral deflection of the pendulum requires that its two sheet metal layers move longitudinally with respect to one another, and this causes the elastomeric layer adhered therebetween to undergo elastic deformation since it is subjected to shear forces as a result of its side extremities moving in opposite longitudinal directions. This elastic deformation of the resilient inner layer of the pendulum is intended to damp pendulum deflection in a desirable manner, and to augment return of the pendulum to its normal position as inertial forces diminish, thereby contributing to smooth and controlled braking response as well as helping to remove the braking effects as quickly as possible when they are no longer needed.

In accordance with the present invention, it is perceived that the desirable effects just noted were to a considerable degree sacrificed by the particularities of the pendulum configuration and mounting techniques used heretofore, which in fact have been the source of undesirable but largely unappreciated problems occurring in actual usage. Thus, for example, prior art implementations of the multiple-layer leaf-type pendulum have failed to provide the desirable benefits of its inherent self-damping capability, and have in fact introduced eccentricities and irregularities in the inertial displacement of the pendulum, resulting in inappropriate and undesirable braking effects exerted upon the towed vehicle, erratic in nature and disproportionate to the actual inertial effect causing the response. Indeed, at times the resulting braking response would be too great, or too small, while at other times the result could be chatter (i.e., rapid on and off or increase and decrease of braking effect), caused by resonance or other vibratory mechanical oscillation in the sensing pendulum.

To a considerable extent, the adverse effects just noted have resulted from the manner in which the laminate-form leaf-type pendulum was mounted for inertia-induced flexure. That is, the multi-layer "sandwich" structure of the pendulum was typically mounted by use of a clamping means by which the top of the pendulum was clamped to a fixed, rigid mount or support structure. While some such suspensions also used a right-angled offset portion of one or both of the sheet metal layers of which the pendulum was formed to provide a means for suspending the pendulum from its top, the pendulum has heretofore also been rigidly secured by a clamp, which in effect squeezed the various layers of the pendulum against one another at the uppermost end, holding them tightly against a support disposed parallel to the axis of the pendulum. While this captured the upper end extremity of the pendulum and supported it in a dependable manner, it also caused serious but unappreciated problems. That is, as noted above, the lower extremity of the pendulum carried a weight, whose purpose is to accentuate the inertial effect on the pendulum caused by braking of the towing vehicle, and the customary manner of securing this weight to the lower extremity of the pendulum securely captures the entire lower extremity of the latter, i.e., both metal layers as well as the elastomeric internal layer. Accordingly, both the upper and lower extremities of the pendulum were rigidly captured relative to one another, with the result that the different layers were unable to move longitudinally relative to one another as the pendulum underwent lateral flexure, except to the very limited extent that such motion was made possible through tensional lengthening of one metal layer accompanied by compressive shortening of the other, and the extent to which the metal layers could separate by bowing and moving away from one another, stretching the elastomeric intermediate layer laterally through tension. These unintended and unappreciated effects changed the spring action of the pendulum dramatically, making it uncoordinated and irregular, while at the same time substantially nullifying the otherwise-obtainable smooth, coordinated, elastically-damped flexure of the pendulum, causing it to act erratically, in extreme cases actually causing it to "oil-can," i.e., erratically snap over-center, with resulting erratic braking action.

A further anomaly, probably based upon misconception, exhibited by prior pendulum-type inertial sensors of the type described is the use of comparatively long pendulum blades, by which comparatively large flexural excursion was obtained. This was thought necessary in order to provide desired resolution in the system, since the pendulum excursion is used to produce a graduated, proportional response for use in controlling the application of the towed vehicle brakes. That is, the pendulum motion is used to produce a corresponding analog signal in accordance with which braking is effected. For example, the pendulum motion may be used to either occlude or open a path for a light beam extending between a source and a photo detector, such that higher inertial levels causing greater pendulum deflection correspondingly increase the amount of light sensed by the photodetector. However, while it may be thought to be easier, as an abstract matter, to obtain higher degrees of control resolution by use of larger pendulum deflection, this is not the case where the longer pendulum contributes directly to instability of the aforementioned nature, creating a situation in which deflection increments ar not uniform in relation to the corresponding inertial effects, and are not consistent.

BRIEF SUMMARY OF THE INVENTION

The present invention provides a novel and highly advantageous solution for the problems described above, based upon new perceptions and recognition of the underlying problems. More particularly, the present invention provides subtle structural changes and enhancements in the basic form and suspension of multilayer inertial sensing pendulum used in electric braking systems of the type described above, by which the eccentricities and irregularities of the resulting braking control system are obviated and precluded, with the result that inertial sensing is carried on in a much smoother, distortion-free and extremely reliable manner which in addition is not subject to disruption due to such effects as inertial surges, "jerks," and the like resulting from such things as road surface irregularities, etc. Indeed, the inertial sensing function provided in accordance with the present invention is so smooth, reliable and distortion-free that the resulting system does not require the customary interconnection with the tow vehicle brake light circuit, by which most state of the art inertially-actuated electric braking systems are maintained in a de-energized state until the tow vehicle brakes are actuated and their brake lights energized, notwithstanding the fact that the inertial sensor is supposed to be controlling the braking system. That is, practically all inertially-actuated prior art systems have had to guard against undesired inadvertent actuation of the braking system due to inadvertent and undesired inertial sensor operation resulting, for example, from road surface irregularity such as chuck holes, railroad tracks, etc., or for example, from erratic inertial sensor response to momentary manual application of the braking system control by which towed vehicle sway and the like are corrected.

Accordingly, it is a major objective and advantage of the present invention to provide a new physical configuration for pendulum-type inertial sensors of the type used in electric brake control systems and the like, pursuant to which the problems of prior such devices are avoided and made obsolete. This major objective and advantage is achieved through a number of more particularly-cognizable physical attributes of the pendulum and its mounting structure, pursuant to which the overall aspect ratio of the pendulum is changed in order to make its natural frequency of vibration be substantially higher than previous such units (the pendulum beam being made less flexible, to thereby exhibit lower flexure per unit inertial load).

Further, and of considerable importance to the underlying concept and structure of apparatus in accordance with the invention, a novel and advantageous type of mounting means is provided for the inertial sensing pendulum, pursuant to which elastomeric damping is perfected and made uniform, such that the advantages of this effect are finally realized and made possible. In addition, the invention contemplates the provision of a new and advantageous form of pendulum-mounting structure, which provides for high efficiency and reliability in the manufacture and assembly of the resulting unit, while at the same time achieving increased effectiveness and ease in achieving attitude correction for pendulum positioning, by which the pendulum may be readily adjusted to a vertical orientation following installation of the control unit in the tow vehicle, during which the particularities of the position in which the control is mounted often are such as to otherwise place the pendulum in a non-vertical position and thus interfere with normal sensing of horizontally-directed inertia forces, as normally occur during vehicle braking.

The foregoing major objectives and advantages of the invention, together with other features and attributes thereof, will become increasingly apparent upon consideration of the ensuing more detailed specification, directed to a particular preferred embodiment of the invention used to illustrate its underlying concepts.

BRIEF DESCRIPTION OF THE DRAWINGS

FIG. 5 is an enlarged, fragmentary end view of the apparatus showing how the pendulum is mounted;

FIG. 6 is an end view pictorially showing the prior-art pendulum-mounting arrangement as well as showing the resulting flexural bending mode exhibited by the pendulum under some circumstances; and FIG. 7 is an end view similar to FIG. 4 but showing the apparatus repositioned for attitude adjustment of the pendulum in a second direction.

DESCRIPTION OF PREFERRED EMBODIMENTS

Figure 1:
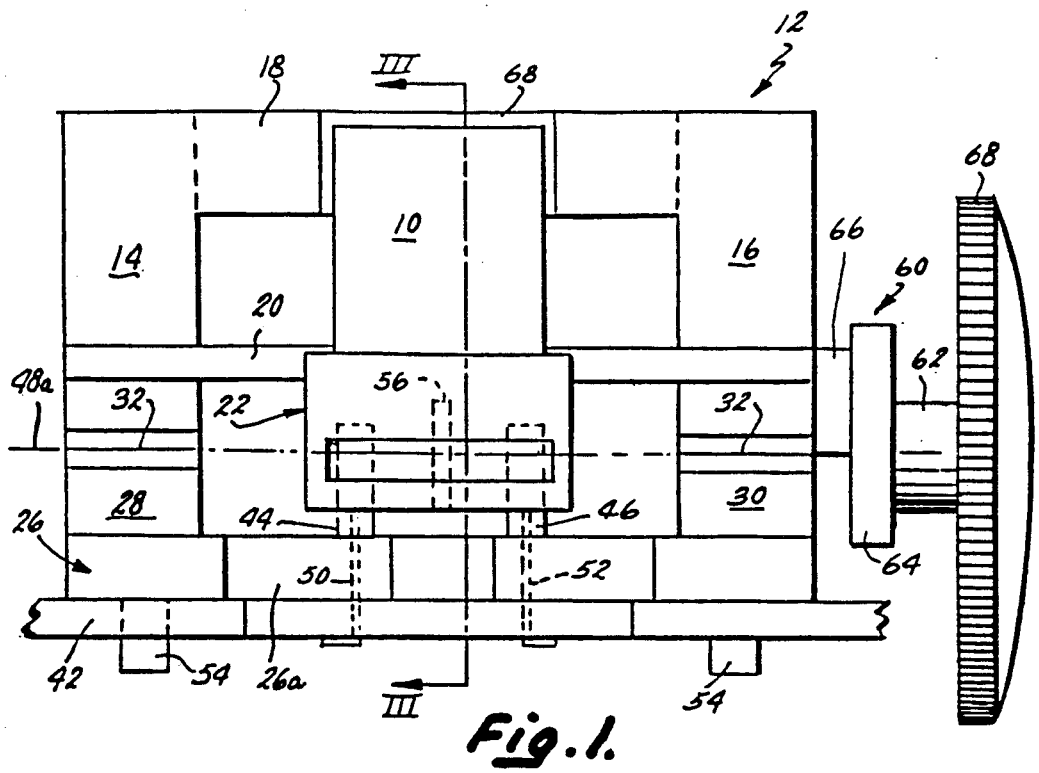
FIG. 1 is an enlarged side elevational view showing the inertial pendulum and its supporting structure.

As indicated previously, the general nature of the pendulum-type inertial sensor used in what is perhaps the most successful and most frequently-encountered electric braking system is shown in U.S. Pat. No. 3,981,544 and its related U.S. Pat. No. 3,967,863. As may be seen in such patents, this form of inertial sensing pendulum comprises a multiple-layered "sandwich" comprising, in the preferred embodiment, a pair of beryllium copper strips which are disposed along opposite sides of, and adhesively secured along their length to a layer of elastomeric material (for example, "double-faced" rubber-based or other such elastomeric tape, preferably a thin, adhesively-coated polyester film such as that manufactured by Morgan Adhesive Company of Stow, Ohio, and identified as "IB-1190").

As illustrated in the aforementioned prior patents, the way such a pendulum is typically mounted is by bending the top end extremities of the beryllium copper strips laterally at right angles, so that the pendulum may be supported from its top by resting such offsets upon a slot-like support, and then rigidly clamping the pendulum blade against an adjacent vertical surface located immediately beneath the splayed top of the pendulum. Such a mounting arrangement is shown pictorially or schematically in FIG. 6, in which the pendulum is designated by the numeral 1, the support 2, and the clamp 3. In such a mounting, the splayed upper portion of the pendulum is merely to help initially suspend the pendulum from corresponding support, and is not in and of itself suitable for actual operation in a vehicle since, in the first place, such a suspension would merely permit the pendulum to rock back and forth under the influence of braking inertia, and would not produce any flexure of the pendulum blade or any resilient damping effect, etc., and, in the second place, such a mounting would not secure the pendulum against vertical forces generated when the vehicle encountered road surface irregularities, etc.

The present invention recognizes that the typical prior art pendulum mounting, such as that illustrated in FIG. 6, severely inhibits consistent and gradual pendulum flexure in response to inertial loading, since it forces the pendulum to act, in effect, as a multi-leaf spring having both of its ends rigidly secured together. In such a situation, the resulting spring action is irregular and erratic, for the reasons noted previously. Indeed, the pattern of flexure for such a pendulum is likely to be that indicated in FIG. 6, in which the pendulum blade 1 actually defines a somewhat S-shaped curve rather than the anticipated and desired smooth arcuate curve which would result from a single leaf or from multiple leaves which are not fixed to one another at both ends. As may be appreciated, the motion pattern characteristic of a pendulum which exhibits such flexure is complex and non-uniform; consequently, this erratic pattern will also be present in the analog output of any sensor used to monitor and represent the pendulum motion, as well as in the resultant actuation of the brake system so controlled, which will thus embody irregular application, chatter, and other undesirable attributes.

While the lower extremity of the pendulum used in accordance with the present invention continues to maintain the presence of a centered weight or mass which enhances pendulum flexure under the influence of braking inertia, the pendulum itself is mounted in an entirely different way at the top, providing for free longitudinal movement of the metal leaves relative to one another, under the influence of viscous damping provided by the interposed elastomeric adhesive layer which interconnects the two metal strips. Furthermore, as may be seen in the appended drawings, the inertial sensing pendulum 10 in accordance with the present invention is comparatively short with respect to its width, particularly in relation to prior art structures (in which the "free" portion of which, between the mounting at the top and the weight block at the bottom, was on the order of about three times longer). In this regard, the preferred length-width ratio for this "free" portion of the pendulum in accordance herewith is on the order of about 1:2, for the particular embodiment being described. Other important attributes of this form of pendulum are set forth in more detail hereinafter.

The pendulum 10 is mounted on a pivotal assembly 12 comprising a pair of mutually-spaced upwardly-extending support arms 14 and 16 which carry a crossbeam 18 from which the pendulum 10 is suspended, preferably in a particular manner described more fully hereinafter. The mutually-spaced support arms 14 and 16 are also interconnected by a small-section blocking bar 20 which is disposed directly in alignment with a weighting block 22 secured at the bottom of the pendulum, so as to prevent undue excursion of the pendulum in that direction. The block 22 comprises a rectangular member mounted on the end of the pendulum 10 and having a transverse passage 24 in which a metal or other weight is secured. In this connection, it is to be noted that the weighting block 22 receives the bottom of the pendulum in a slot and is secured in place by adhesive or the like in a manner which provides a unified structure that captures the lower end of the pendulum and secures its different component layers with respect to one another. An alternative arrangement will be noted hereinafter.

It is to be expressly noted that the mounting assembly 12 preferably comprises an integrally-molded structure which includes not only the elements mentioned above (i.e., suspension arms 14 and 16, and crossarm 18) but, in addition, a support base portion 26 having mutually-spaced support arms 28 and 30, upon which the suspension arms 14 and 16 are mounted. The manner in which this is preferably accomplished is by molding the entire assembly as an integral one-piece unit and providing a thin "living hinge" section 32, which allows for pivotal movement of the suspension arms with respect to their corresponding support arms, the extent of such movement being limited to a predetermined range by corresponding angularly-disposed shoulders 34, 36 and 38, 40, respectively. A suitable material for the integrally-molded mounting assembly 12 is nylon, but other generally rigid polymers or the like may be equally suitable.

As illustrated in the various Figures, the support base 26 is preferably formed so as to be directly mountable upon a printed circuit (i.e., "p.c.") board 42, such that the entire inertial sensor may be so mounted for rapid assembly procedures. Previously, pendulum attitude adjustment was provided by mounting the pendulum in a manner permitting relative angular motion of the entire pendulum support structure with respect to the instrument housing in which it was contained, as opposed to the more limited type of adjustment provided in accordance herewith, as just described. This change brings about significant advantages during assembly, since the approach used previously, as just described (and as may be seen in the various prior patents identified above) requires the use of elongated, flexible electrical conductors between the optical components and the remainder of the circuitry, in order to permit the large-scale motion of the entire apparatus just noted. This in turn mandates the use of manual assembly procedures, which are comparatively expensive and which also represent a source of potential defect as a result of human error.

In contrast with the foregoing, the present invention provides for mounting of the optical components (here designated by the numerals 44 and 46, and constituting an "optical pair," i.e., a light source such as a photodiode and a light detector such as a phototransistor) directly upon the pendulum mounting assembly support base 26, in a manner whereby the height of the light beam provided by the optical pair (here indicated by the circular passage 48) is readily aligned and located in its desired position with respect to the pendulum. That is, the electrical conductors 50 and 52 of the optical pair extend downwardly through appropriate passages in support base 26 and through the p.c. board 42, where they are accessible for connection to the other electrical components of the brake-actuation system.

Furthermore, in a preferred embodiment of the invention, the optical pair is positioned and mounted by use of a support base 26 having a separately-formed, and separable, mounting block 26a (FIGS. 1 and 2), which fits into a recess defined between leg portions 26b of the support base. This facilitates mounting of the optical pair 44, 46, since one need only place the mounting block 26a atop the circuit board in the desired position, separate and apart from the remainder of the mounting assembly 12, and insert the leads 50, 52 through the corresponding passages in the mounting block and the p.c. board, bending the protruding portions laterally as shown in FIG. 1 to hold the optical devices and mounting block in position on the circuit board and at the same time automatically set the desired location of the optical path 48. That is, the thickness of mounting block 26a may be made such that the optical pair is automatically indexed in position at a desired level above the top of the support base 26 when they are mounted in the manner just stated.

Figure 2:
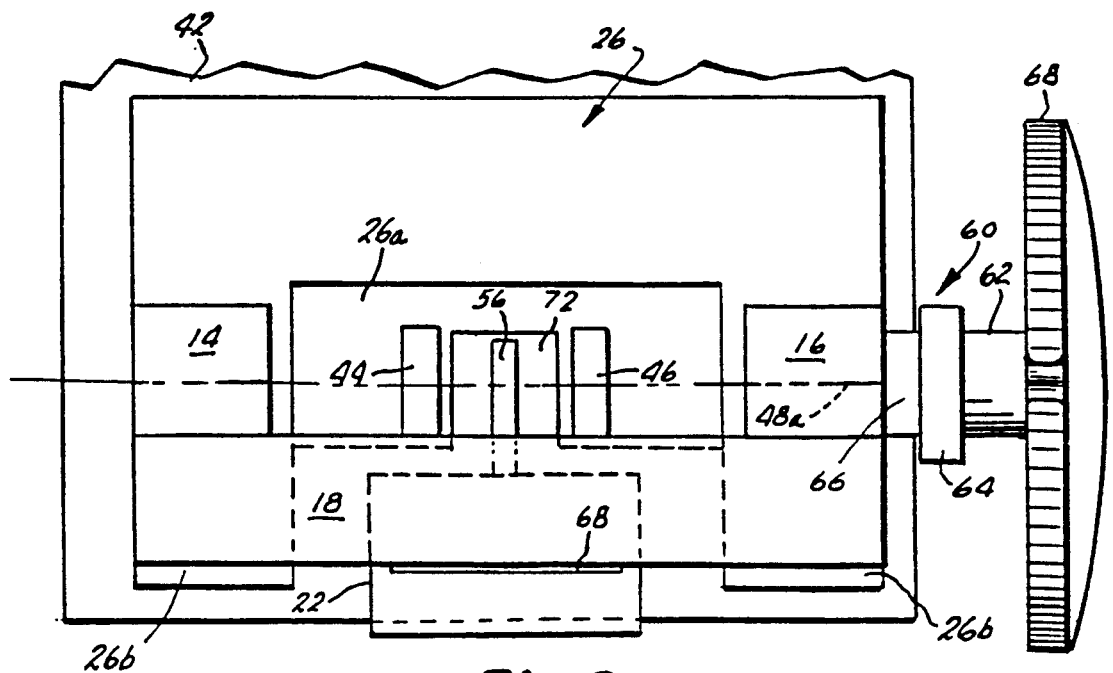
FIG. 2 is an overhead plan view of the apparatus as shown in FIG. 1.

The mounting assembly 12 is secured to the p.c. board 42 with leg portions 26b disposed on each side of mounting block 26a, as shown in FIG. 2. Preferably, the attachment of support base 26 to circuit board 42 is accomplished by one or more pairs of spaced posts 54 which are molded integrally as part of the pendulum mounting assembly 12 and are of a stiffly flexible nature, the preferred assembly procedure being to place the integral mounting assembly 12 upon the p.c. board 42 in the position just noted, and push the posts 54 through corresponding passages provided in the p.c. board for this purpose. Thus, virtually no assembly is required for the pendulum mounting assembly 12, apart from the simple mounting of the optical pair 44, 46 upon mounting block 26a in the manner described, after which the electrical leads 50, 52 may be flow-soldered in place to establish their electrical connections and secure the mounting block and optical pair to the circuit board.

As previously indicated, the pendulum 10 is secured to the mounting assembly 12 in a novel and distinctive manner. More particularly, the entire securement for the pendulum is preferably accomplished by adhesive attachment of one of its metal leaves to the face of the crossbeam 18 in the desired location (which may be denoted by an integrally-molded recess in the face of crossbeam 18, or by a slightly protruding peripheral frame 68 [FIGS. 1 and 2]having a size substantially corresponding to that of the end of pendulum 10). In this manner, only one of the metal strips comprising the laminate pendulum structure 10 is actually secured to the mounting assembly 12, i.e., the metal strip 10c (FIG. 5) disposed closest to crossbeam 18. The other laminate components in the pendulum 10 are therefore only secured to one another at the top of the pendulum by their integral structure, i.e., the adhesively-connected elastomeric strip 10b disposed between the two metal layers. A preferred adhesive for use in mounting the pendulum 10 in this manner is the resin adhesive sold by Morgan Adhesive Company and identified as "Dymax 029," using activator 535; however, many commercial adhesives would no doubt be satisfactory for such an application.

Figure 3:
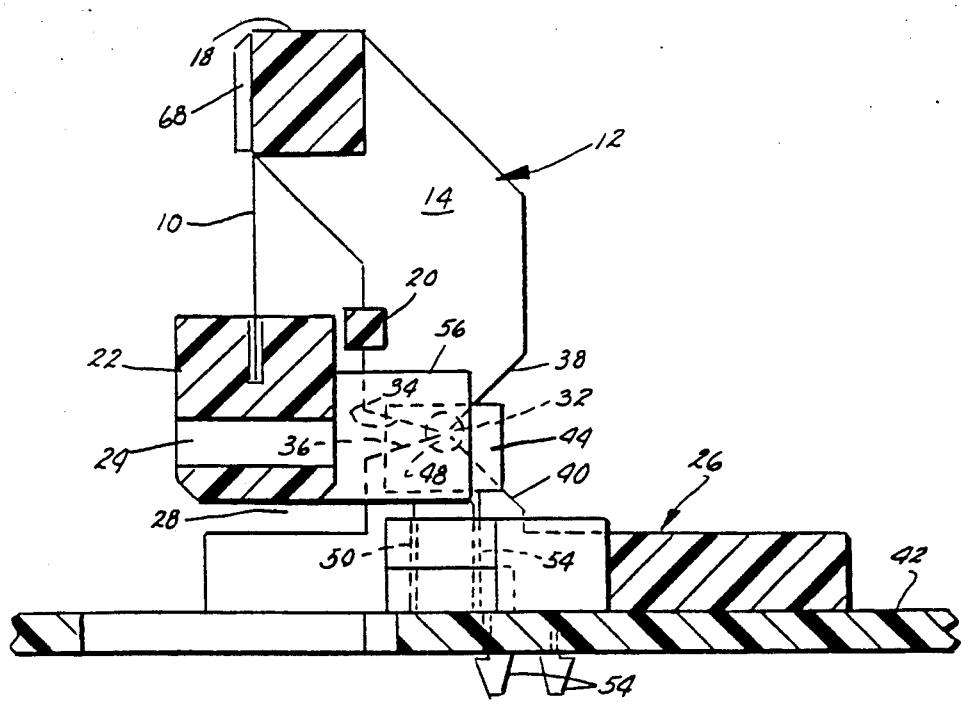
FIG. 3 is an end view thereof.
Figure 4:
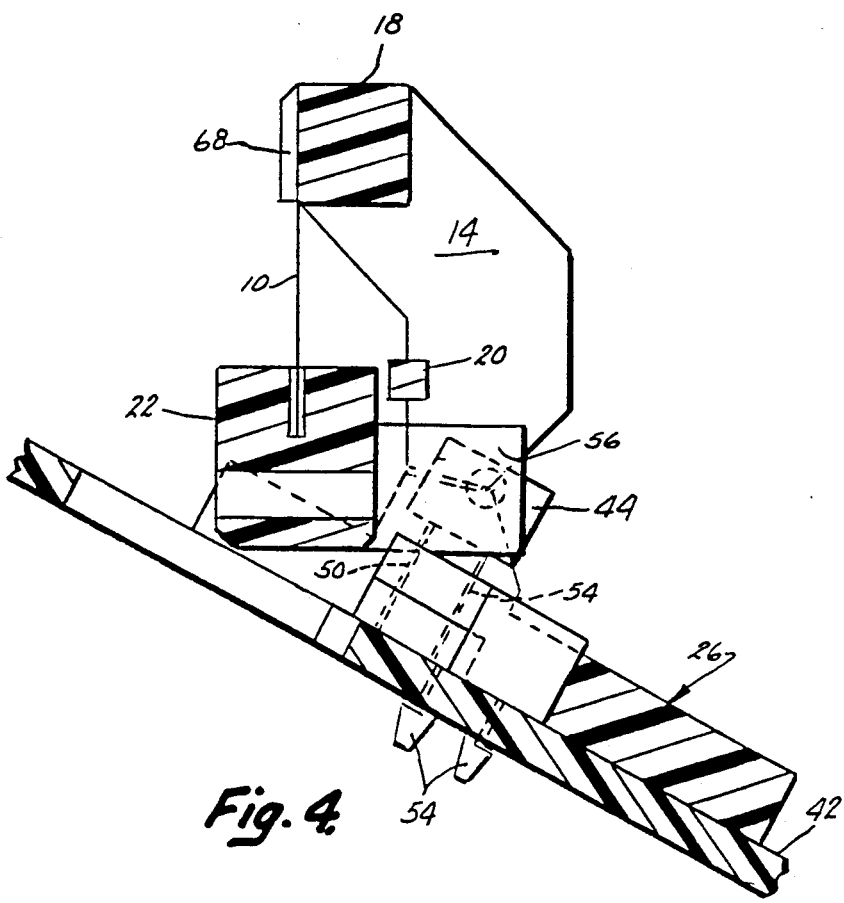
FIG. 4 is an end view similar to FIG. 3, but showing the apparatus repositioned for attitude adjustment of the pendulum in a first direction.

With the weight-carrying pendulum end block 22 secured in place (adhesively, with the end of the pendulum disposed within a slot, as illustrated) at the bottom of the pendulum 10, it will therefore be understood that the particular manner in which the pendulum is preferably secured to the crossbeam 18, as described above, provides for damped but unrestricted floating movement of the different layers of the pendulum longitudinally with respect to one another during flexure of the pendulum. That is, as the pendulum weight 22, 24 swings the lower part of the pendulum to the left, as seen in FIG. 3, under the influence of inertia created by tow vehicle braking, a flag or shutter 56 carried with the weight block 22 moves correspondingly to the left, thereby progressively opening a light passage between the optical pair 44, 46, along path 48. As this occurs, the pendulum 10 flexes laterally in a smooth arcuate bending mode, requiring that the metal strip 10a disposed on the left as seen in FIG. 5 begins to describe a curve of shorter radius than the metal strip 10c disposed on the right side of the pendulum as seen in that Figure. Consequently, the metal strip 10a located on the left must not be precluded from moving longitudinally upwardly with respect to the other strip 10c, as seen in such Figure, and this capability is provided by the novel mounting in accordance with the present invention.

Accordingly, as may be understood upon reflection, if the upper portion of the pendulum 10 is rigidly secured across all of its layers in the manner shown by FIG. 6, as was in fact done heretofore, and if the bottom of the pendulum is also secured across all of its layers, as was also done heretofore, the left-hand strip of metal in the pendulum would have to exhibit compound flexure, potentially including even certain bending in the nature of elastic buckling, in responding to the inertial forces applied (e.g., as illustrated at least partially in FIG. 6).

Accordingly, the manner in which the pendulum mounting provided by the present invention facilitates the free flexure of the two metal strips in the pendulum, together with enabling the consistent and unrestricted viscous damping characteristic provided by the elastomeric connecting layer, will be appreciated by those skilled in the art. At the same time, it should be noted that the bottom extremity of the pendulum may also be secured in this general manner, i.e., by securing only one of the metal leaves to the weight block 22, leaving the other free to move longitudinally with respect thereto. If this approach is used, the top end of the pendulum may, if desired, be secured in a different manner, even by clamping, but it will also be understood that the preferred adhesive mounting structure for the top of the pendulum disclosed above is a significant improvement, in and of itself, from the standpoint of effective, efficient, and reliable manufacturing techniques, the upper portion of the mounting assembly (suspension arms 14 and 16, crossbeam 18, etc.) already being secured to the lower portion (including the support base 26 and support arms 28, 30, etc.) upon initial forming of the component parts.

Similarly, it will be noted that the means for rotating the pendulum suspension arms 14 and 16 with respect to the support base, etc., in order to adjust the attitude (e.g., verticality) of the pendulum in a given setting, is preferably comprised of an integrally-molded stub shaft and eccentric assembly 60 (FIGS. 1 and 2), which includes an adjustment shaft 62 which is secured to suspension arm 16 through an eccentric connecting link 64 and a stub shaft 66, the axis of shaft 62 being centered upon the hinge pivot axis 48a. An operating knob 68 is also preferably molded integrally with the adjustment shaft 62, to provide a convenient means for the vehicle operator to effect rotational adjustment as required, shaft 62 extending outward through the case wall of the instrument by means of an appropriate aperture (not specifically shown). Preferably, shaft 62 is encircled by an appropriate split grommet (not shown) which interposes frictional forces between the shaft and the housing wall through which it extends, such that the entire adjustment assembly 60, together with support arms 14 and 16 and crossbeam 18, will automatically be held, by such frictional forces, in desired positions of adjustment once rotational correction has been made.

In the foregoing regard, it is important to note that the axis 48a of the living hinge 32 is preferably aligned directly upon the axis of the light beam passage 48. Consequently, corrective pendulum attitude adjustment comprises rotation about the optical axis of the detection pair 44, 46, so that the verticality of the pendulum may be corrected under any anticipated mounting position without changing the relative position of the shutter flag 56 with respect to such optical axis and thereby changing the inertial sensitivity of the device. In order to accommodate such corrective pendulum attitude adjustment, the support base 26 (in particular, the mounting block portion 26a thereof) forms a recess 72 (FIGS. 1 and 2) into which the projecting end of pendulum flag 56 may move upon corresponding rotational movement of adjustment knob 66. At the same time, the need for hand-wiring during assembly which was characteristic of prior art devices in order to provide the requisite long flexible conductors which enabled pendulum attitude adjustment, is completely obviated.

It should be noted that a preferred optical pair 44, 46 for use in connection with the invention is that manufactured by Motorola and identified as MLED 71 (infrared L.E.D.) and MRD 701 (phototransistor), or equivalent, which provides a highly restricted (small diameter) optical beam for interaction with the pendulum shutter 56. In particular, such an optical pair provides a detection beam which is merely on the order of about twenty thousandths of an inch wide, and this enables use of the relatively short, stiff (minimum deflection) pendulum, as noted above. In turn, use of such a short pendulum, with a length-to-width aspect ratio as noted above (i.e., on the order of about 1:2, where the metal strips are about one mil [0.001"] thick and the elastomeric layer about three mils [0.003"] thick), provides a highly desired stiffness modulus for the pendulum by which it merely deflects (flexes) enough to clear the optic path 48, i.e., on the order of about 0.020" to 0.030" under the influence of about one unit of gravitational force (i.e., one "G"), which contributes substantially to detection stability. In combination with the novel pendulum-mounting arrangement discussed above and the resulting unrestricted viscous damping provided by the elastomeric interlayer and made possible in this manner (by which critical damping of the pendulum is achieved), inertial sensing stability is so improved that the braking control unit (preferably of the type described in co-pending (application Ser. No. 390,617, filed Aug. 7, 1989, may entirely omit the customary interconnection with the vehicle brake light circuit, heretofore considered an indispensable part of electric brake control apparatus whether inertially-responsive or otherwise.

Nonetheless, there is no need to fear the presence of erratic or inadvertent actuation resulting from rough driving surfaces, etc., due to the extreme stability provided by the present improvements. At the same time, braking actuation of the towed vehicle occurs smoothly and effectively, and only as a result of intentional or intended actuation, and is of substantially better quality and resolution than that characteristically provided by prior art devices.

It is to be understood that the foregoing description of a preferred embodiment of the invention is provided for purposes of the description and illustration, and not as a measure of the invention, whose scope is to be defined by reference to the ensuing claims. Thus, while those skilled in the art may devise embodiments of the particular concepts presented in the foregoing illustrative disclosure which differs somewhat from the particular embodiment shown and described in detail herein, or may make various changes in structural details to the illustrated embodiment, all such alternative or modified embodiments which utilize the concepts of the invention and clearly incorporate the spirit thereof are to be considered as within the scope of the claims appended herebelow, unless such claims by their language specifically state otherwise.

The embodiments of the invention in which an exclusive property or privilege is claimed are defined as follows:

1. A freely-flexing multi-layer cantilever-type inertial sensor, comprising in combination: a flexible multi-layer beam having first and second sides; a generally rigid support structure for said beam, said support structure having a beam-mounting surface disposed laterally adjacent said beam at a predetermined location along the length of the beam; and means for securing said beam to said support structure at said beam-mounting surface, said securing means extending between and connecting a selected one of said beam sides and said beam-mounting surface while not directly connecting the other such beam side to said support structure, such that different layers of said beam may shift longitudinally with respect to one another at said predetermined location upon lateral flexure of said beam in response to inertial forces.

2. The apparatus of claim 1, wherein said securing means comprises an adhesive.

3. The apparatus of claim 1, wherein said selected one beam side and said beam-mounting surface are disposed generally parallel and contiguous to one another.

4. The apparatus of claim 3, wherein said securing means comprises an adhesive.

5. The apparatus of claim 3, wherein said securing means extends between and interconnects said mounting surface and a selected number of layers of said flexible multi-layer beam which is less than the total number thereof.

6. A freely-flexing multi-layer cantilever-type inertial sensor, comprising in combination: an elongated flexible multi-layer beam having first and second sides; a generally rigid support structure for said beam, said support structure having a beam-mounting surface disposed laterally adjacent said beam near one end thereof; means for securing said beam to said support structure at said beam-mounting surface; a weighting member attached to said beam near the other end thereof and means for fixedly connecting the layers of said beam to one another at one common place along their mutual length to preclude relative longitudinal shifting of said different layers of said beam at said common place but allow such shifting at other points along their corresponding lengths upon arcuate flexure of said beam in response to inertial forces.

7. The apparatus of claim 6, wherein said one common place along the length of said beam is near one or the other end thereof.

8. The apparatus of claim 7, wherein said one common place along the length of said beam is near said other end thereof.

9. The apparatus of claim 8, wherein said means for fixedly connecting said layers to one another is located at said weighting member.

10. The apparatus of claim 9, wherein said means for fixedly connecting said layers to one another comprises an adhesive.

11. The apparatus of claim 10, wherein said means for securing said beam to said support structure extends between and interconnects said beam-mounting surface and a selected number of layers of said flexible multilayer beam which is less than the total number thereof.

12. Support means for a pendulum-type inertial sensor, comprising in combination: an integrally-molded structure of polymeric material defining a support base and at least one generally rigid support arm projecting from said base; a support beam extending from said arm; means for mounting a pendulum-type inertial sensor upon said beam; means for movably connecting said beam to at least one of said support arm and support base, to provide a range of attitude-adjustment motion for said inertial sensor; and means for securing said integrally-molded structure to a fixed support in a substantially non-movable manner whereby non-flexing electrical conductors may be used to connect components carried by said support means with other components carried by said fixed support.

13. The apparatus of claim 12, wherein said means for movably connecting said beam comprises an integrally-molded hinge formed unitarily with said integrally-molded structure.

14. The apparatus of claim 13, wherein said integrally-molded structure includes means for mounting an optical component pair comprising a light source and a light receiver disposed in mutually-aligned relation along a light axis.

15. The apparatus of claim 14, wherein said light axis is generally coincident with the pivot axis of said hinge.

16. The apparatus of claim 13, wherein said integrally-molded structure comprises a pair of said projecting support arms, said pair of arms being mutually spaced from one another, and said support beam extending between said mutually-spaced arms.

17. The apparatus of claim 16, wherein said means for movably connecting said beam comprises a pair of said integrally-molded hinges, each of said hinges being associated with opposite ones of said mutually-spaced arms.

18. The apparatus of claim 17, wherein said pair of hinges is aligned with one another along a common pivot axis.

19. The apparatus of claim 18, wherein said integrally-molded structure includes means for mounting an optical component pair comprising a light source and a light receiver disposed in mutually-aligned relation along a light axis, and wherein said light axis is generally coincident with said common hinge pivot axis.

20. The apparatus of claim 12, wherein said means for securing said integrally-molded structure to a fixed support comprises at least one integrally-molded attachment member formed unitarily with said molded structure.

21. The apparatus of claim 20, wherein said integrally-molded attachment member comprises a projecting lug.

22. The apparatus of claim 20, wherein said fixed support comprises a circuit board and said means for securing said molded structure comprises at least one integrally-formed member for engaging portions of said circuit board.

23. The apparatus of claim 22, wherein said integrally-molded attachment member comprises a projecting lug adapted to extend into a recess formed in said circuit board.

24. A stable, low-deflection, cantilevered pendulum-type inertial sensor for electrically-controlled vehicular braking systems, comprising: a generally rigid support and a flexible blade-like beam secured near one end to said support so as to extend generally vertically with respect thereto; said beam being sufficiently stiff to have a deflection of less than about 0.050" when subjected to inertial forces of about 1.0 G.

25. The inertial sensor of claim 24, further including means for damping the deflection motion of said beam.

26. The inertial sensor of claim 25, wherein said means for damping effects critical damping of said beam.

27. The inertial sensor of claim 24, wherein said flexible beam comprises a multi-layered member.

28. The inertial sensor of claim 27, wherein said flexible beam comprises at least two thin blades juxtaposed with respect to one another and secured on opposite sides of a resilient damping member.

29. The inertial sensor of claim 28, wherein said beam is mounted for inertially-induced flexing by securing one of said two thin blades to said generally-rigid support while leaving the other such blade generally unsecured with respect there to except through the interconnection of said two blades.

30. The inertial sensor of claim 24, wherein said flexible beam comprises at least two thin blades juxtaposed with respect to one another and secured on opposite sides of a resilient damping member.

31. The inertial sensor of claim 24, wherein said beam is sufficiently stiff to have a deflection of from about 0.020" to 0.030" under an inertial force of about 1.0 G.

32. A freely-fixing cantilever-type inertial sensor and non-restrictive mount therefor, comprising in combination: an elongated flexible beam having first and second sides and an elastically yieldable midsection therebetween for permitting longitudinal shifting of one of said sides relative to the other during flexure of said beam; a generally rigid support structure for said beam, said support structure having a beam-mounting surface disposed laterally adjacent one of said beam sides at a predetermined location along the length of the beam; and means for securing said beam to said support structure at said beam-mounting surface, said securing means extending between and connecting said one of said beam sides and said beam-mounting surface while not directly connecting the other such beam side to said support structure, whereby the elastically yieldable midsection of said beam may freely distort along a gradient disposed transversely of said beam and said other side of the beam may unrestrictedly shift longitudinally with respect to said one side upon lateral flexure of said beam in response to inertial forces.

33. The inertial sensor and mount as recited in claim 32, wherein said securing means comprises an adhesive disposed between and interconnecting said one side of said beam and said support structure.

* * * * *

UNITED STATES PATENT AND TRADEMARK OFFICE
CERTIFICATE OF CORRECTION

PATENT NO. : 5,058,960
DATED : October 22, 1991
INVENTOR(S) : Eccleston, et al

It is certified that error appears in the above-indentified patent and that said Letters Patent is hereby corrected as shown below:

In the Abstract, line 18:

"current" should be --correct--.

line 20, "focres" should be --forces--.

Column 3, line 18:
"ar not" should be --are not--.

Column 9, line 64:
Before "application: delete --(--.

Column 12, Claim 32, line 44:
"freely-fixing" should be --freely-flexing--.

Signed and Sealed this

Twenty-ninth Day of June, 1993

Attest:

MICHAEL K. KIRK

Attesting Officer

Acting Commissioner of Patents and Trademarks